UNITED STATES PATENT OFFICE.

BENJAMIN F. SHAW, OF CAMBRIDGE, MASSACHUSETTS.

IMPROVEMENT IN THE MANUFACTURE OF GELATINE FROM IMPURE SOLUTIONS.

Specification forming part of Letters Patent No. 133,896, dated December 10, 1872.

*To all whom it may concern:*

Be it known that I, BENJAMIN F. SHAW, of Cambridge, in the county of Middlesex and State of Massachusetts, have invented an Improved Method of Utilizing Impure Solutions of Gelatine; and I do hereby declare that the following is a description of my invention sufficient to enable those skilled in the art to practice it.

In my invention I take a quantity of "soup" (the more recently boiled the better) and stir into it a solution of crystals of sulphate of zinc, at the rate of one to two grains of the crystals to a gallon of the soup. Letting it stand until cold, I then charge it with sulphurous-acid gas, (preferably made from burning sulphur,) by injecting the gas at or near the bottom of the vessel until a marked lightening of the color is perceptible; and I then mix with the gelatine, at the rate of a grain to ten gallons of the solution, sulphite of potash or sulphite of soda, or, if opacity of the resultant glue is not objectionable, sulphite of lime. Solution of caustic soda may be used instead of the sulphites named, care being observed to preserve the acid reaction of the gelatine.

These salts take up the sulphuric acid as fast as it is formed by the deoxidation of the coloring matter in the soup, or by the oxidation of the sulphurous acid by other means.

I let the solution stand twenty-four hours and draw off the clearer portion, leaving in the vessel the scum and settlings, and then boil in a wooden or lead-lined vessel, (by means of steam in lead pipes,) to expel the sulphurous acid and excess of water, removing the scum and evaporating to the consistency of thick molasses. I then pour the product into tin pans rubbed with oil, (kerosene preferred,) and dry in the most convenient manner. Instead of drying this product by itself, it may be used as a liquor in which to boil common glue-stock.

Some soups are emulsive—soapy and whitish. I treat this kind as above directed until it is ready to be boiled, and then raise the temperature gradually to 200° Fahrenheit, with as little disturbance as possible. I dilute it carefully with water until it marks $2\frac{1}{2}$° Baumé, and let it stand until the coagulum separates from the gelatine, which requires from one to six days. The clear portion is then drawn off, (being careful not to disturb the coagulum,) and boiled as directed above. The coagulum may now be suffered to stand a few days longer, when more of the clear fluid will be found to have separated from it. When all the gelatine it is practicable to isolate in this way has been recovered the scum and coagulum may be subjected to a process for the isolation of grease, or disposed of in any other way.

Vessels and apparatus not affected by sulphurous acid should be used. Contact of air with the gelatine should be prevented as much as possible, by covering the standing vessels. The process will be favored by keeping the room at the temperature of 60° to 76° Fahrenheit.

I am aware that sulphurous-acid gas has been applied, in solution and otherwise, to glue-stock, previous to boiling, to bleach it; and I do not claim such application.

I claim—

1. The charging of solutions of gelatine with sulphurous-acid gas, substantially as and for the purpose set forth.

2. The use of any sulphite, or salts convertible into sulphites, in treating solutions of gelatine, substantially as and for the purpose specified.

3. The use of sulphate of zinc, either alone or in combination with sulphurous acid, substantially as described, as a preservative of the gelatine.

B. F. SHAW.

Witnesses:
 FRANCIS GOULD,
 M. W. FROTHINGHAM.